United States Patent
Ngo et al.

(10) Patent No.: US 12,327,219 B2
(45) Date of Patent: Jun. 10, 2025

(54) METHODS AND SYSTEMS FOR INVENTORY MANAGEMENT FOR BLOCKCHAIN-BASED TRANSACTIONS

(71) Applicant: Shopify Inc., Ottawa (CA)

(72) Inventors: Andrew Ngo, Toronto (CA); Alan Ashley Fulks, Kelowna (CA); John Jong-Suk Lee, Waterloo (CA)

(73) Assignee: Shopify Inc., Ottawa (CA)

( * ) Notice: Subject to any disclaimer, the term of this patent is extended or adjusted under 35 U.S.C. 154(b) by 373 days.

(21) Appl. No.: 17/866,746

(22) Filed: Jul. 18, 2022

(65) Prior Publication Data

US 2023/0359984 A1 Nov. 9, 2023

Related U.S. Application Data

(60) Provisional application No. 63/338,553, filed on May 5, 2022.

(51) Int. Cl.
*G06Q 10/087* (2023.01)
*H04L 9/00* (2022.01)

(52) U.S. Cl.
CPC ............. *G06Q 10/087* (2013.01); *H04L 9/50* (2022.05)

(58) Field of Classification Search
CPC ....... G06Q 10/087; H04L 9/50; H04L 63/123; H04L 2209/56
See application file for complete search history.

(56) References Cited

U.S. PATENT DOCUMENTS

| | | |
|---|---|---|
| 6,401,118 B1 | 6/2002 | Thomas |
| 10,505,726 B1 | 12/2019 | Andon et al. |
| 10,929,842 B1 | 2/2021 | Arvanaghi et al. |
| 11,062,284 B1 | 7/2021 | Cunningham et al. |

(Continued)

FOREIGN PATENT DOCUMENTS

| | | |
|---|---|---|
| CN | 110111102 | 8/2019 |
| CN | 110490752 | 11/2019 |

(Continued)

OTHER PUBLICATIONS

Xingxiong Zhu et al; "Application of Blockchain in Document Certification, Asset Trading and Payment Reconciliation"; Journal of Physics: Conference Series, vol. 1187, Issue 5.

(Continued)

*Primary Examiner* — Florian M Zeender
*Assistant Examiner* — Kimberly S. Bursum
(74) *Attorney, Agent, or Firm* — Rowand LLP

(57) ABSTRACT

Methods and system for managing inventory in the context of online transactions involving blockchain-based payments. Examples may include determine an inventory count associated with an item with which a user device initiates a payment involving a blockchain transaction. The system determines a likelihood of completion with regard to the blockchain transaction based on one or more metrics related to recent transactions on the blockchain. Responsive to the likelihood of completion being above a minimum threshold value, the system records a hold in memory in association with the inventory count and then determines that the blockchain transaction has been completed and, in response, removes the hold from memory and decrements the inventory count.

20 Claims, 7 Drawing Sheets

(56) References Cited

U.S. PATENT DOCUMENTS

| | | |
|---|---|---|
| 11,075,891 B1 | 7/2021 | Long |
| 11,276,014 B2 | 3/2022 | Augustine et al. |
| 11,295,363 B1 | 4/2022 | Kao et al. |
| 11,443,838 B1 | 9/2022 | Cordonnier |
| 11,455,694 B2 | 9/2022 | Dinunzio et al. |
| 11,657,428 B1 | 5/2023 | Ritchie |
| 2005/0208940 A1 | 9/2005 | Takese |
| 2007/0174079 A1 | 7/2007 | Kraus |
| 2010/0131386 A1 | 5/2010 | Shiely et al. |
| 2010/0235218 A1 | 9/2010 | Erhart et al. |
| 2013/0246146 A1 | 9/2013 | Fischer et al. |
| 2014/0129422 A1 | 5/2014 | Zhou |
| 2014/0351953 A1 | 11/2014 | Bhatia |
| 2014/0358629 A1 | 12/2014 | Shivaswamy et al. |
| 2015/0186980 A1* | 7/2015 | Wood Bradley ... G06Q 30/0202 705/26.81 |
| 2015/0249872 A1 | 9/2015 | Lee et al. |
| 2015/0324840 A1 | 11/2015 | Ramnath Krishnan |
| 2015/0363783 A1* | 12/2015 | Ronca ................. G06Q 20/382 705/71 |
| 2015/0363858 A1 | 12/2015 | Kleinhandler et al. |
| 2016/0171534 A1 | 6/2016 | Linden |
| 2016/0210674 A1 | 7/2016 | Allen et al. |
| 2016/0292672 A1 | 10/2016 | Fay et al. |
| 2017/0011460 A1 | 1/2017 | Molinari et al. |
| 2017/0116693 A1 | 4/2017 | Rae |
| 2017/0140408 A1 | 5/2017 | Wuehler |
| 2017/0155515 A1 | 6/2017 | Androulaki et al. |
| 2017/0221029 A1 | 8/2017 | Lund et al. |
| 2017/0330174 A1 | 11/2017 | Demarinis |
| 2017/0357966 A1 | 12/2017 | Chandrasekhar et al. |
| 2018/0108036 A1 | 4/2018 | Laufenberg et al. |
| 2018/0150869 A1 | 5/2018 | Finnegan |
| 2019/0066065 A1 | 2/2019 | Wright et al. |
| 2019/0073666 A1 | 3/2019 | Ortiz et al. |
| 2019/0130439 A1 | 5/2019 | Handrigan et al. |
| 2019/0139136 A1 | 5/2019 | Molinari et al. |
| 2019/0164157 A1 | 5/2019 | Balaraman |
| 2019/0220836 A1 | 7/2019 | Caldwell |
| 2019/0220917 A1* | 7/2019 | Busjaeger ......... G06Q 30/0633 |
| 2019/0266616 A1 | 8/2019 | Strutton |
| 2019/0294817 A1 | 9/2019 | Hennebert |
| 2019/0303892 A1 | 10/2019 | Yantis et al. |
| 2019/0311341 A1 | 10/2019 | Rice |
| 2020/0005284 A1 | 1/2020 | Vijayan |
| 2020/0053081 A1 | 2/2020 | Park et al. |
| 2020/0112446 A1 | 4/2020 | Yoshihama |
| 2020/0134660 A1 | 4/2020 | Kadaster |
| 2020/0153607 A1 | 5/2020 | Shi et al. |
| 2020/0242105 A1 | 7/2020 | Rich et al. |
| 2020/0244752 A1 | 7/2020 | Trainor |
| 2020/0364703 A1 | 11/2020 | Joveski |
| 2020/0379981 A1 | 12/2020 | Yoon |
| 2021/0014042 A1 | 1/2021 | Sivathanu |
| 2021/0124616 A1* | 4/2021 | Verma ................ G06Q 30/0601 |
| 2021/0241351 A1 | 8/2021 | Francis et al. |
| 2021/0243201 A1 | 8/2021 | Tandel |
| 2021/0256070 A1 | 8/2021 | Tran |
| 2021/0366586 A1 | 11/2021 | Ryan et al. |
| 2021/0383334 A1 | 12/2021 | Krasnyansky |
| 2021/0390531 A1 | 12/2021 | Voorhees |
| 2022/0035936 A1 | 2/2022 | Lin |
| 2022/0058633 A1 | 2/2022 | Yantis |
| 2022/0076279 A1 | 3/2022 | Renaud |
| 2022/0101316 A1 | 3/2022 | Cramer |
| 2022/0198418 A1 | 6/2022 | Kang |
| 2022/0210061 A1 | 6/2022 | Simu |
| 2022/0222364 A1 | 7/2022 | Roberts |
| 2022/0292490 A1 | 9/2022 | Collen |
| 2022/0318233 A1 | 10/2022 | Martinez |
| 2022/0351187 A1 | 11/2022 | Kim |
| 2022/0398340 A1 | 12/2022 | Jakobsson |
| 2023/0043095 A1 | 2/2023 | Miliam |
| 2023/0062776 A1 | 3/2023 | Vosseller et al. |
| 2023/0073545 A1 | 3/2023 | Kurian |
| 2023/0079195 A1 | 3/2023 | Matheson |
| 2023/0086191 A1 | 3/2023 | Jakobsson |
| 2023/0195855 A1 | 6/2023 | Mavromatis |
| 2023/0206218 A1 | 6/2023 | Defour |
| 2023/0306412 A1 | 9/2023 | Gaur |
| 2023/0360029 A1 | 11/2023 | Pranger |
| 2024/0020682 A1 | 1/2024 | Castagna |
| 2024/0037593 A1 | 2/2024 | Navon |
| 2024/0039722 A1 | 2/2024 | Deluca |
| 2024/0046074 A1 | 2/2024 | Lewis |

FOREIGN PATENT DOCUMENTS

| | | |
|---|---|---|
| CN | 108364173 | 1/2021 |
| CN | 109272380 | 1/2023 |
| EP | 3748914 | 12/2020 |
| EP | 4148643 A1 | 3/2023 |
| RU | 2018132715 A | 3/2020 |
| TW | 1674543 | 10/2019 |
| WO | 2013111142 A2 | 8/2013 |
| WO | 2016202952 | 12/2016 |
| WO | 2017197110 | 11/2017 |
| WO | 2020092900 | 5/2020 |
| WO | 2022204404 | 9/2022 |
| WO | 2024039369 | 2/2024 |

OTHER PUBLICATIONS

European Search Report dated Oct. 10, 2022, EP Application No. 22169579.4.
Sep. 10, 2021, XP055966676, Retrieved from the Internet: URL: http://en.wikipedia.org/w/index.php?title=Non-fungible_token&oldid=3593775#Collectibles.
Office Action dated Oct. 17, 2022, U.S. Appl. No. 17/344,251.
Office Action, U.S. Appl. No. 17/475,240 dated May 9, 2024.
Office Action dated Jul. 11, 2023, U.S. Appl. No. 17/475,240.
Office Action dated Mar. 6, 2023, U.S. Appl. No. 17/479,650.
Office Action dated Apr. 21, 2021, U.S. Appl. No. 16/782,561.
Office Action dated Oct. 7, 2021, U.S. Appl. No. 16/782,561.
Office Action dated Jan. 20, 2022, U.S. Appl. No. 16/782,561.
Office Action dated Jul. 26, 2022, U.S. Appl. No. 16/782,561.
Office Action dated Nov. 25, 2022, U.S. Appl. No. 16/782,561.
Office Action dated Apr. 14, 2023, U.S. Appl. No. 16/782,561.
Dialog, Online Searcher, To Be Or Not to Be Competitive Intelligence Tools, Aug. 2019.
Office Action dated Jul. 27, 2021, U.S. Appl. No. 16/782,556.
Office Action dated Feb. 23, 2024; U.S. Appl. No. 17/893,370.
PCT Supplementary International Search Report relating to Application No. PCT/CA2023/050452 dated Jul. 12, 2024.
Office Action, U.S. Appl. No. 17/473,284, filed Sep. 21, 2023.
Office Action, U.S. Appl. No. 17/903,109, filed Jun. 3, 2024.
USPTO; Office Action relating to U.S. Appl. No. 17/955,631 dated Apr. 15, 2024.
Antonopoulos, Andreas; "Mastering Bitcoin Unlocking Digital Crytocurrencies", O'Reilly Media, Inc., all pages (Year 2014).
G. Gan, E. Chen, Z. Zhou and Y. Zhu, "Token-Based Access Control," in IEEE Access, vol. 8, pp. 54189-54199, 2020, doi: 10.1109 /ACCESS.2020.2979746. (Year: 2020).
Rafati et al., "DeTi: A Decentralized Ticketing Management Platform," J Netw Syst Manage, 2022, 30(4):62. doi: 10.1007/s10922-022-09675-3. Epub Jul. 26, 2022. PMCID: PMC9315850. (Year: 2022).
Regner et al., "NFTs in Practice—Non-Fungible Tokens as Core Component of a Blockchain-based Event Ticketing Application." retrieved from https://www. researchgate.neUpublication/336057493_NFTs_in_Practice_-_Non-Fungible_Tokens_as_Core_Component_of_a_Blockchain-based_Event_Ticketing_Application (Year: 2019).
Feulner et al., "Exploring the use of self-sovereign identity for event ticketing systems," Electron Mark, 2022, 32 (3):1759-1777. doi: 10.1007/s12525-022-00573-9. Epub Jul. 30, 2022. PMID: 35965736; PMCID: PMC9361939. (Year: 2022).

(56) References Cited

OTHER PUBLICATIONS

Office Action dated Sep. 20, 2024, U.S. Appl. No. 17/955,631.
Office Action dated Sep. 29, 2024, U.S. Appl. No. 17/867,975.

* cited by examiner

FIG. 8

METHODS AND SYSTEMS FOR INVENTORY MANAGEMENT FOR BLOCKCHAIN-BASED TRANSACTIONS

CROSS-REFERENCE TO RELATED APPLICATIONS

The present application claims priority to U.S. provisional patent application No. 63/338,553 filed May 5, 2022, the contents of which are hereby incorporated by reference.

TECHNICAL FIELD

The present disclosure relates to computer-implemented inventory management methods and, in particular, systems and methods for inventory tracking in the context of blockchain-based transactions relating to inventory items.

BACKGROUND

In an online environment, systems may be configured to manage competing orders for a limited quantity of resources. Order management systems or inventory management systems may be used to determine allocation of limited resources in the context of competing orders.

One context in which this may arise is e-commerce. E-commerce systems may concurrently have hundreds or thousands of active users browsing available items for a merchant, adding items to a virtual shopping cart object associated with the browsing session, initiating a checkout process, and/or initiating a payment operation.

BRIEF DESCRIPTION OF THE DRAWINGS

Embodiments will be described, by way of example only, with reference to the accompanying figures wherein:

FIG. 8 is an example of a home page of an administrator, in accordance with an example embodiment.

Like reference numerals are used in the drawings to denote like elements and features.

DETAILED DESCRIPTION OF EMBODIMENTS

Figure 1:
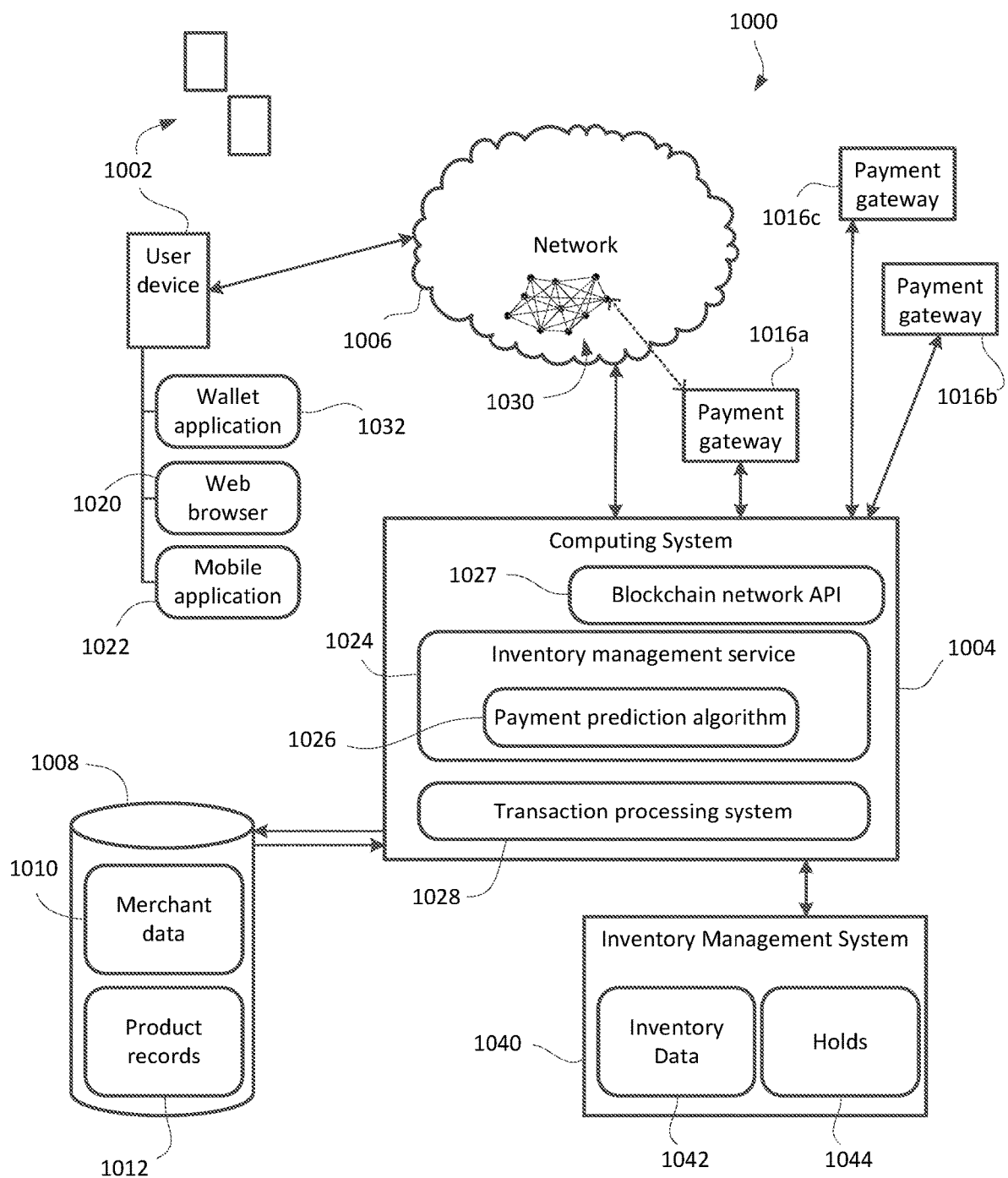
FIG. 1 is a simplified example system.

In one aspect, the present application discloses a computer-implemented method. The method may include receiving, at an e-commerce system from a user device, an initiate payment signal with regard to an item, wherein the initiate payment signal is associated with a blockchain transaction. It may further include determining an inventory count associated with the item; determining a likelihood of completion with regard to the blockchain transaction based on one or more metrics related to recent transactions on the blockchain; responsive to the likelihood of completion being above a minimum threshold value, recording a hold in memory in association with the inventory count; and determining that the blockchain transaction has been completed and, in response, removing the hold from memory and decrementing the inventory count.

In some implementations, determining the likelihood of completion includes querying a computing device and receiving, from the computing device, the one or more metrics. In some cases, the computing device includes a blockchain node in a blockchain network. In some cases, the one or more metrics includes one or more of a count of unconfirmed transactions, a measure of transaction confirmation time, a gas price, or a measure of transaction fee size.

In some implementations, determining the likelihood of completion is further based on one or more of a payload size, a transaction fee associated with the blockchain transaction, or stored user data associated with the user device.

In some implementations, determining the likelihood of completion includes determining the likelihood that the transaction is confirmed within a maximum window of time.

In some implementations, the hold includes an expiry time, and the method further includes, prior to determining that the blockchain transaction has been completed, re-determining the likelihood of completion at the expiry time and, responsive to the likelihood of completion being above the minimum threshold value, updating the expiry time to a later time.

In some implementations, the hold includes a hard hold that reserves at least one of the inventory count of the item to block competing purchases. In some cases, a number of hard holds associated with the inventory account matches the inventory count for the item, and further comprising receiving a competing purchase request from a further user device with regard to the item and, based on the inventory count matching the number of hard holds, refusing the request.

In some implementations, the memory further includes a merchant maximum time setting, and determining the likelihood of completion includes determining a projected time to completion and determining that the projected time to completion is less than the merchant maximum time setting.

In some implementations, determining that the blockchain transaction has been completed includes determining that the blockchain transaction has been included in a block within the blockchain.

In another aspect, the present application discloses a computing system including one or more processing units, one or more data storage units, and memory storing processor-executable instructions that, when executed by the one or more processing units, are to cause the processing units to carry out the operations of one or more of the methods described herein.

In yet another aspect, a non-transitory, computer readable storage medium is disclosed. The medium may store processor-executable instructions that, when executed, cause one or more processors to carry out the operations of one or more of the methods or processes described herein.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . and . . . " is intended to cover any one or more of the listed elements, including any one of the listed elements alone, any sub-combination, or all of the elements, without necessarily excluding any additional elements, and without necessarily requiring all of the elements.

In the present application, the terms "e-commerce platform" or "e-commerce system" refers broadly to a computerized system (or service, platform, etc.) that facilitates commercial transactions, namely buying and selling activities over a computer network (e.g., Internet). An e-commerce platform may, for example, be a free-standing online store, a social network, a social media platform, and the like. Customers can initiate transactions, and associated payment requests, via an e-commerce platform, and the e-commerce platform may be equipped with transaction/payment processing components or delegate such processing activities to one or more third-party services. An e-commerce platform may be extendible/extensible by connecting one or more additional sales channels representing platforms where products can be sold. The e-commerce platform may serve one merchant in some implementations. The e-commerce platform may be a multi-merchant platform in other cases, where each merchant is able to use some or all of the available services to configure an online storefront and provide commerce services to customers of the online storefront. A multi-merchant e-commerce platform may operate across a range of geographic regions, and may operate in multiple countries, currencies, and time zones.

Some of the examples below refer to a "product record". A product record in this context may refer to data regarding a specific product item, or a specific version of that product item. The data may include details of the product item, technical specifications, narrative description, image(s) of the product item, customer reviews, pricing information, inventory information, shipping information, or any other product data of a similar nature. In some cases a product record may be a web page. In some cases, the product record may be an XML record. The product record may be embodied in any other suitable mark-up language or other coding language.

E-commerce and other systems for responding to requests for limited items may implement an inventory management system. This may be referred to as an order management system in some cases. The inventory management system may track counts of available items. It may interface with an order handling component to provide data on number of available items or to advise the order handling component when no further items are available, and to coordinate with a fulfillment system that allocates items to requestors and initiates shipping or download or other fulfillment actions to distribute items to requestors. Such systems may be configured to determine the allocation of limited resources in the context of competing orders, particularly when the processing of those orders may use different asynchronous processes.

In the context of e-commerce, inventory management includes tracking the number of available items (typically products) and when a purchase is successfully made through the e-commerce system by completing a payment operation, to decrement the count of items and to initiate fulfillment actions to distribute the purchased item(s) to a shipping address.

E-commerce systems may concurrently have hundreds or thousands of active users browsing available items for a merchant, adding items to a virtual shopping cart object associated with the browsing session, initiating a checkout process, and/or initiating a payment operation. Depending on the implementation, if not handled correctly, inventory mismanagement can result in "oversell" which gives rise to inventory conflicts, failed or refused checkout processes, error messages, and the possible need for refunds where an item is no longer available for shipping/fulfillment after a payment confirmation arrives.

In many systems, when a browsing user adds an item to a virtual shopping cart the inventory management system may place a "hold" on that item, meaning that while the actual inventory count is not decremented the fact that one of the items is temporarily reserved is noted in memory. This may prevent two users from attempting to complete a purchase for the same item when only one item is available, resulting in a failed transaction for one of the users and the possible need to process refunds if the purchase action has been completed. In some cases, holds can be categorized as a "soft hold" or a "hard hold". A soft hold may have a short expiry time, or the soft hold may terminate as soon as a browsing session ends. This may prevent a "soft hold" from tying up available inventory by a user that is unlikely to complete the transaction or is taking too long. In some implementations a "hard hold" may be recorded in association with the item during a checkout process, or if the purchase transaction is initiated, or if the purchase transaction has been completed but not yet fulfilled. The "hard hold" may have no expiry time or may have a longer expiry time. In some cases the "hard hold" may be removed if the purchase fails to complete or if something occurs prior to fulfillment to reverse or cancel the transaction.

Because of abandoned carts, bots, and other factors specific to online computer-implemented commerce, inventory management systems balance inventory conflict risk against excessive or overly aggressive inventory reservations or holds since stale reservations may inadvertently tie up inventory for users unlikely to complete a transaction for days or weeks.

Different payment gateways and payment pathways may have different payment completion or confirmation times, meaning some payment mechanisms may tie up inventory for longer periods that others if a hold is placed on items subject to a pending checkout or pending payment operation. This issue is exacerbated in the case of blockchain-based transactions.

Blockchain-based payments or transactions often have long delays in payment confirmation. This may significantly exacerbate the inventory management problem and may result in stale holds. To be confirmed, a blockchain transaction needs to be included in a mined block that is added to the blockchain. Some blockchain protocols are configured such that blocks are only mined every X minutes, such as about every 10 minutes. Moreover, not all pending transactions may be included in the next block to be mined. Mining nodes select transactions for inclusion in a block and may select pending transactions on the basis of the size of the payload in the transaction, the transaction fee payable to the mining node, or other factors. When there are a large number of pending transactions awaiting inclusion in a block, pending transactions may sit waiting in a mempool of unconfirmed transactions for hours or days.

According to one aspect, the present application describes an improved inventory management system and method. The inventory management system and method may be used in e-commerce in some implementations. When a blockchain-based payment is initiated by a user device in association with an item in inventory, the system determines a likelihood of completion with regard to the blockchain-based payment based on one or more metrics related to recent transaction on the blockchain network. If that likelihood of completion is above a minimum threshold value, then the system will record a hold in association with the item. Once the blockchain transaction is completed, the hold is removed and the inventory count for that item is decremented.

Determining the likelihood of completion may involve obtaining metrics from a blockchain node. The metrics may include measures related to blockchain network load or congestion that correlate to probably time for transaction confirmation. Examples may include a count of unconfirmed transaction in a mempool, a measure of transaction confirmation time (e.g. average or median time to block inclusion for last X transactions), a measure of transaction fee size (e.g. the average or median transaction fee paid by transaction included in the last N blocks). Other measures may also be used. In networks like the Ethereum network, current gas price or other such metrics may correlate to measures of congestion and, thus, to time for transaction confirmation. These metrics may be used, together with details of the transaction, such as the payload size, transaction fee included, gas cost, etc., to determine (a) a probable time to confirmation, or (b) a probability that the transaction will be completed within a certain window of time. The certain window may be a maximum window of time, which may be set by a merchant, an administrator of the e-commerce system, or other entity.

The term "blockchain node" in this context may be understood as referring to a full active blockchain node within the blockchain network, but it may also include partial blockchain nodes that perform fewer than all functions of a full node. It may include a node or service that that does not perform active blockchain protocol activities as a node within the blockchain network, but instead monitors blockchain network conditions and makes the metrics available. It may also include more than one blockchain node. It will also be understood that any reference herein to "gas price" does not necessarily limit the present application to use in connection with the Ethereum blockchain protocol, but may be interpreted as referring to any metric in another blockchain protocol equivalent to a "gas price" indicative of cost of computing resources associated with execution of computational operation by the network. It will also be understood that some implementations may not use "gas price" as a metric and/or may not involve a blockchain protocol that features a "gas price".

In accordance with some aspects of the present application, when dealing with a blockchain-based payment operation rather than immediately and automatically placing a hold on an inventory item associated with that payment operation the system first determines a likelihood of completion and only records the hold if the likelihood of completion is greater than a minimum threshold value. This may enable the system to identify transactions that are unlikely to be confirmed within a certain window of time, or that are probably not going to be completed (in some protocols, transactions that fail to be confirmed within a period of time (e.g. 24 hours, 48 hours, etc.) may be deemed rejected and purged from a mempool). By not recording a hold in association with those payment requests, the system avoids the likely implementation of a stale hold that ties up inventory for a transaction that is unlikely to complete.

Reference will now be made to FIG. 1, which diagrammatically illustrates a simplified example system 1000 in accordance with an aspect of the present application. In this example, the system 1000 includes a network-connected server, which in this example is a computing system 1004, and a plurality of user devices 1002. The user devices 1002 and computing system 1004 may communicate over a network 1006. The network 1006 may include interconnected wired and/or wireless networks, including the Internet. The user devices 1002 may include a range of computing devices, such as laptops, desktops, tablets, smartphones, and the like.

The computing system 1004 may, in some embodiments, be an e-commerce platform. The e-commerce platform may provide an online storefront for one or more merchants. In some cases, the e-commerce platform may provide online storefronts for thousands of individual merchants. Example e-commerce platforms will be described in greater detail below.

The computing system 1004 may be implemented using one or more servers. The computing system 1004 may include data storage 1008, which may include one or more databases or other data structures within or accessible to the servers. When the computing system 1004 is an e-commerce platform, the data storage 1008 may include merchant data 1010 regarding merchant accounts with the computing system 1004, including merchant identifiers and settings and parameters for respective merchants. The data storage 1008 may further include product records 1012. In some cases, each merchant account has a set of associated product records 1012 reflecting the products or services offered via that merchant account. The product records 1012 may include details regarding one or more products, images, pricing, shipping information, technical parameters, textual description, reviews, or other data regarding the product. Product records 1012 may be grouped into classes and/or subclasses.

The user devices 1002 may include a web browser 1020 and/or a mobile application 1022 through which the user device 1002 is able to connect with the computing system 1004 in order to browse a merchant's online store interface so as to view available product or services. The web pages or other resources served to the user devices 1002 via the web browser 1020 or mobile application 1022 may be generated or obtained from the stored product records 1012. As a user device 1002 searches or browses products from a particular merchant, the computing system 1004 may retrieve the corresponding product records 1012 for causing display of the product data on the user device 1002. In some implementations, the merchant data 1010 may include settings or parameters that configure the UI and presentation served to the user devices 1002, thereby providing users with a merchant-specific storefront within which to browse and purchase items.

The e-commerce system 1004 includes an inventory management system 1040, which in this case is illustrated separately from the e-commerce system 1004 for ease of discussion, but which may form part of the e-commerce system 1004 in some implementations. In some other implementations, the inventory management system 1040 may be a standalone system that interfaces with the e-commerce system 1004, for example using a suitable set of APIs.

The inventory management system 1040 may store inventory data 1042 for the product items, such as an inventory count for each item, and may record holds 1044 in association with the product items or inventory count of those items. In some cases, different inventory management systems may be used by different merchants.

In this example, the network 1006 further includes a blockchain network 1030. The blockchain network 1030 may operate in accordance with a blockchain protocol, such as Bitcoin or Ethereum, as examples. The user device 1002 may include a wallet application 1032, which is a blockchain application on the user device 1002 that may store blockchain-related data. In some cases, the wallet application 1032 may securely store public and private key pairs associated with the user device 1002. The public keys may be shared and made publicly available for the purpose of receiving blockchain-based data transfers of fungible or non-fungible tokens. The private keys may be stored securely and confidentially and may be used by the wallet application 1032 in certain signature operations for providing digital signatures that prove ownership of corresponding public keys, among other things. The public keys may represent or be mathematically linked to corresponding wallet addresses. The wallet address may be referenced in blockchain transactions as a sender or recipient of digital assets. A given wallet address may be recorded as the "owner" or holder of one or more digital assets, as reflected by the blockchain. The wallet application 1032 may be referred to as a simplified payment verification (SPV) client in some implementations.

In some implementations, the wallet application 1032 may be configured to generate and/or sign a blockchain transaction. In some cases, the user device 1002 may generate and send a copy of the blockchain transaction to the computing system 1004. In some cases, the blockchain transaction may be generated by the computing system 1004 and provided to the user device 1002 for verification and digital signature. Either the computing system 1004 or the user device 1002 or another element may submit the blockchain transaction to the blockchain network 1030.

The system 1000 may include a plurality of payment gateways 1016 (shown individually as 1016a, 1016b, 1016c). The payment gateways 1016 may receive a payment request and credentials from the computing system 1004 in association with a checkout and payment operation and the payment gateways 1016 may process the payment. Some payment gateways 1016 are dedicated to processing certain types of payments and some may handle more than one type of payment. Example types of payments may include bank debit card payment, credit card payment, a digital wallet payment such as ApplePay™, PayPal™, GooglePay™, etc.

One or more of the payment gateways 1016 may be a blockchain-capable payment gateway 1016a configured to facilitate blockchain-based payments. This payment gateway 1016a may be a blockchain node or may be a non-blockchain node configured to generate and send blockchain transactions to a blockchain node using, for instance, a merchant API. The blockchain transaction signed by the wallet application 1032 may be generated and/or managed by the blockchain-capable payment gateway 1016a in some implementations. In one implementation, if the user device 1002 selects to use a blockchain-based payment for an item the computing system 1004 may obtain wallet information from the wallet application 1032 and may send a request to the blockchain-capable payment gateway 1016a to generate and submit the blockchain transaction. The blockchain transaction may be routed from the payment gateway 1016a to the user device 1002, possibly through the computing system 1004 in some cases, for digital signature by the wallet application 1032 prior to submission to the blockchain network 1030.

The computing system 1004 may include a transaction processing system 1028 configured to manage the checkout process and/or the payment process, such as selecting and interfacing with one or more suitable payment gateways 1016.

The computing system 1004 may also include an inventory management service 1024 to interface with the inventory management system(s) 1040. The inventory management service 1024 may obtain inventory data 1042, like inventory counts, with regard to items for use in determining which items to display as available in a browsing session when rendering an online storefront and/or displaying search results. The inventory management service 1024 may instruct the inventory management system 1040 regarding decrementing of inventory counts and/or the recordal of holds 1044.

The inventory management service 1024 may determine when to instruct the inventory management system 1040 to record holds 1044 based, in part, on a determination of likelihood of completion in association with a blockchain-based payment. In this regard, the inventory management service 1024 may include a payment prediction algorithm 1026 for calculating a likelihood or probability of completion based, in part, on the details of the blockchain transaction and one or more metrics from the blockchain network. The metrics may be measures relating to blockchain transaction confirmation time, such as a measure of transaction fees in recent transactions, a measure of time to confirmation for recent transactions, a count of unconfirmed transaction, gas fees, or other such metrics. The computing system 1004 may include a blockchain network API 1027 for requesting and obtaining such metrics from a blockchain node or a non-blockchain node with access to blockchain network data. In some cases, the blockchain network API 1027 may obtain metrics from the blockchain-capable payment gateway 1016a.

Figure 2:
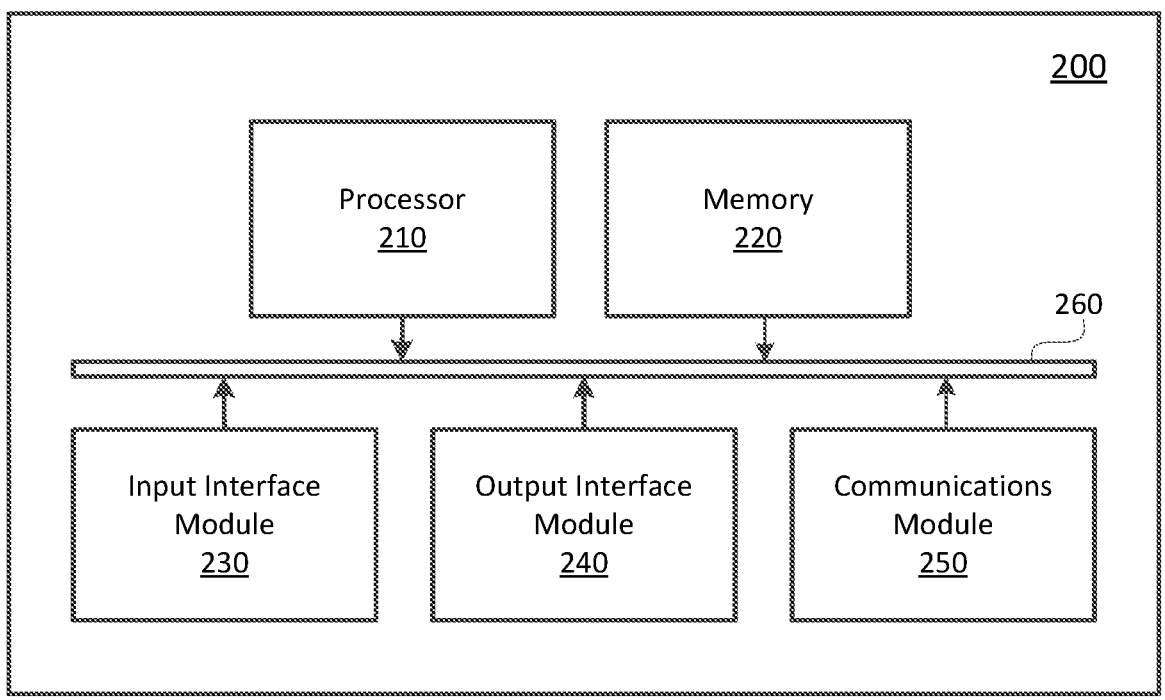
FIG. 2 is a high-level schematic diagram of a computing device.

The computing system 1004 and/or the user devices 1002 may be implemented using one or more computing devices. FIG. 2 is a high-level diagram of an example computing device 200. The example computing device 200 includes a variety of modules. For example, the example computing device 200 may include a processor 210, a memory 220, an input interface module 230, an output interface module 240, and a communications module 250. As illustrated, the foregoing example modules of the example computing device 200 are in communication over a bus 260.

The processor 210 is a hardware processor. The processor 210 may, for example, be one or more ARM, Intel x86, PowerPC processors, or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 200.

The input interface module 230 allows the example computing device 200 to receive input signals. Input signals may, for example, correspond to input received from a user. The input interface module 230 may serve to interconnect the example computing device 200 with one or more input devices. Input signals may be received from input devices by the input interface module 230. Input devices may, for example, include one or more of a touchscreen input, keyboard, trackball or the like. In some embodiments, all or a portion of the input interface module 230 may be integrated with an input device. For example, the input interface module 230 may be integrated with one of the aforementioned example input devices.

The output interface module 240 allows the example computing device 200 to provide output signals. Some output signals may, for example, allow provision of output to a user. The output interface module 240 may serve to interconnect the example computing device 200 with one or more output devices. Output signals may be sent to output devices by output interface module 240. Output devices may include, for example, a display screen such as, for example, a liquid crystal display (LCD), a touchscreen display. Additionally, or alternatively, output devices may include devices other than screens such as, for example, a speaker, indicator lamps (such as, for example, light-emitting diodes (LEDs)), and printers. In some embodiments, all or a portion of the output interface module 240 may be integrated with an output device. For example, the output interface module 240 may be integrated with one of the aforementioned example output devices.

The communications module 250 allows the example computing device 200 to communicate with other electronic devices and/or various communications networks. For example, the communications module 250 may allow the example computing device 200 to send or receive communications signals. Communications signals may be sent or received according to one or more protocols or according to one or more standards. For example, the communications module 250 may allow the example computing device 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 250 may allow the example computing device 200 to communicate using near-field communication (NFC), via Wi-Fi™, via the Ethernet family of network protocols, using Bluetooth™ or via some combination of one or more networks or protocols. Contactless payments may be made using NFC. In some embodiments, all or a portion of the communications module 250 may be integrated into a component of the example computing device 200. For example, the communications module may be integrated into a communications chipset.

Software instructions are executed by the processor 210 from a computer-readable medium. For example, software may be loaded into random-access memory from persistent storage within memory 220. Additionally, or alternatively, instructions may be executed by the processor 210 directly from read-only memory of the memory 220.

Figure 3:
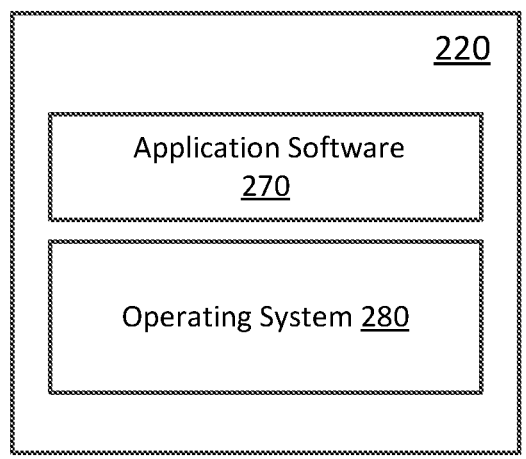
FIG. 3 shows a simplified organization of software components stored in a memory of the computing device of FIG. 2.

FIG. 3 depicts a simplified organization of software components stored in memory 220 of the example computing device 200. As illustrated, these software components include, at least, application software 270 and an operating system 280.

The application software 270 adapts the example computing device 200, in combination with the operating system 280, to operate as a device performing a particular function. While a single application software 270 is illustrated in FIG. 3, in operation, the memory 220 may include more than one application software and different application software may perform different operations. Example application software 270 includes the wallet application 1032 (FIG. 1), the web browser 1020 (FIG. 1), or the mobile application 1022 (FIG. 1).

The operating system 280 is software. The operating system 280 allows the application software 270 to access the processor 210, the memory 220, the input interface module 230, the output interface module 240 and the communications module 250. The operating system 280 may, for example, be iOS™, Android™, Linux™, Microsoft Windows™, or the like.

Figure 4:
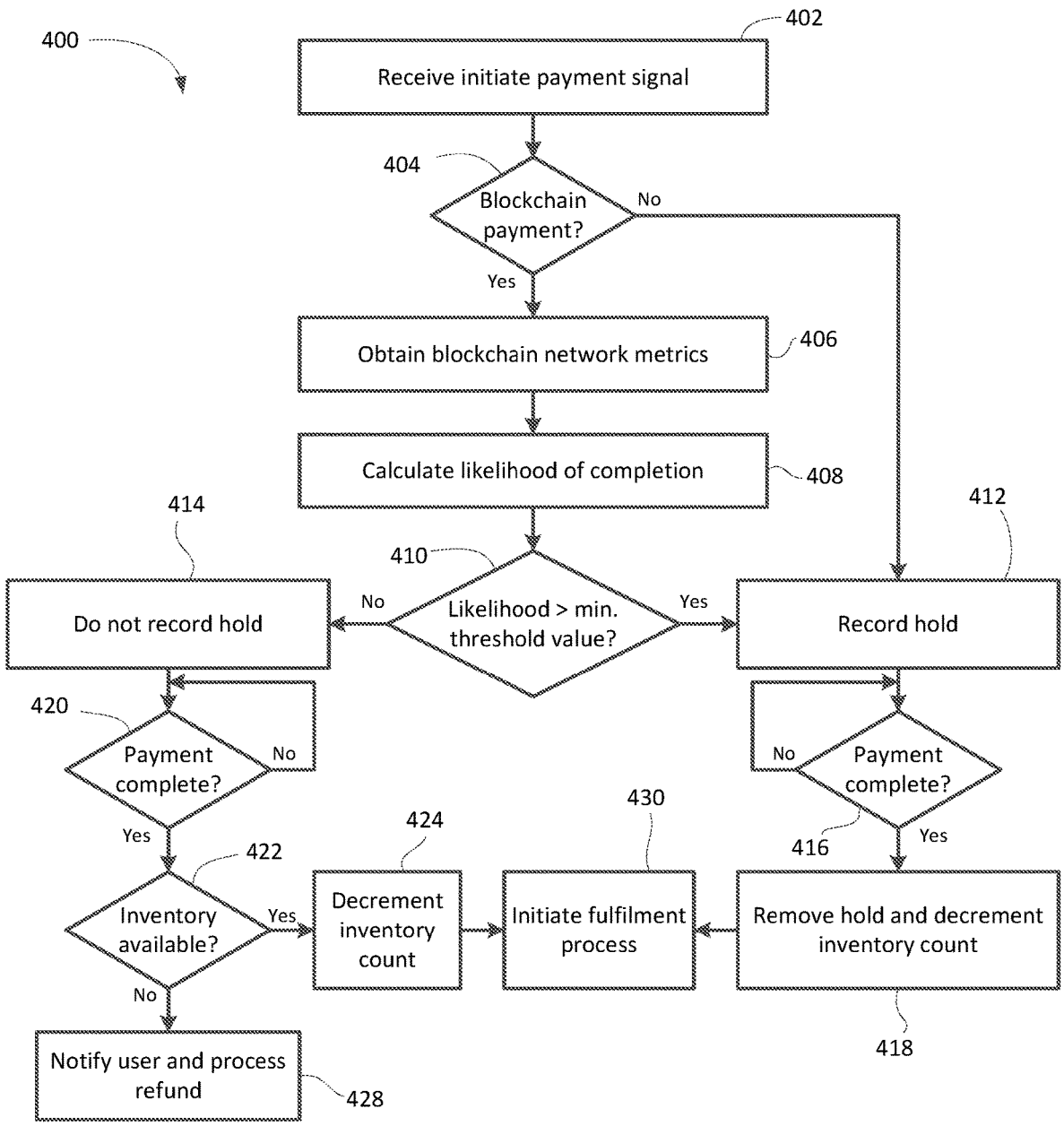
FIG. 4 shows, in flowchart form, one example method of managing inventory in an e-commerce system.

Reference will now be made to FIG. 4, which shows, in flowchart form, one example method 400 of managing inventory in an e-commerce system. The method 400 may be implemented by a computing platform, such as an e-commerce platform in some cases. In particular, the method 400 may be implemented by way of suitably-programmed software instructions stored in memory on a computing device which, when executed by one or more processors of the computing device, cause the computing device to carry out the described operations. In some cases, the method 400 may be implemented by one or more servers forming an e-commerce platform or system, such as the computing system 1004 (FIG. 1). Although the following method 400 is described in the context of an e-commerce implementation, it will be appreciated that the operations of the method 400 may be generalized to apply in applications and contexts other than e-commerce.

In operation 402, the system receives an initiate payment signal. The initiate payment signal may be received in the context of a browsing session by a user device. The user device's browsing session may have an associated virtual shopping cart to which one or more product items have been added. In some cases, the initiate payment signal is received while the user device is browsing a particular item and indicates an intention to move directly to a payment process with regard to the item. In some cases, the initiate payment signal is received while the user device is engaged in a checkout process during which the items in the virtual shopping cart are displayed along with associated data such as total cost, shipping cost (if any), taxes (if any), etc., and during which the user device may be prompted to provide buyer and/or shipping data.

The initiate payment signal may be received as a result of selection of a payment button or other interface element on the graphical user interface of a user device. The user device may transmit the initiate payment signal to the computing system as a result. The initiate payment signal may contain, or may be otherwise be associated with, payment details such as a payment type and any requisite credentials. In some cases, the initiate payment signal may include a blockchain transaction or may provide data regarding an associated blockchain transaction, where the blockchain transaction implements the payment operation to transfer digital assets from a sender account to a recipient account.

If, in operation 404, the system determines that the requested payment operation is not a blockchain-based payment, then it proceeds to operation 412 to record a hold in association with the item (or items) that is the subject of the payment request. That is, the system records a hold in connection with the inventory count of the items so as to "reserve" the items being sought by way of the purchase request.

If the payment operation is determined to be blockchain-based payment in operation 404, then the method proceeds to operation 406. The system obtains blockchain network metrics in operation 406. These may be obtained prior to receiving the payment signal in operation 402 and retrieved from memory in some cases, or may be obtained in response to receipt of the initiate payment signal in some cases. In some implementations, they may be obtained through querying a blockchain node or a non-blockchain computing device with access to blockchain network metrics. Example metrics may include a measure of a time for transaction confirmation for recently confirmed transactions on the blockchain network. The measure may be an average, or median, or some other such measure. The metrics may include a count of unconfirmed transactions in a mempool associated with the blockchain network. The metrics may include an average or median age of unconfirmed transaction in the mempool. The metrics may include a measure of transaction fees for recently confirmed transactions, such as an average or median fee. The metrics may include one or a combination of these examples in some cases. The term "recently confirmed transactions" may refer to the transactions in one or more most-recently mined blocks added to the blockchain.

In operation 408, the system determines a likelihood of completion for the blockchain transaction associated with the current payment request. The likelihood of completion may be a calculated probability of transaction confirmation (e.g. inclusion in a mined block) within a certain window of time, e.g. a maximum time to confirmation. The likelihood of completion may be an estimated time to transaction confirmation. These likelihood of completion calculation may use a function that takes, as inputs, one or more blockchain metrics obtained in operation 406. In some cases, the function further takes as inputs one or more features of the blockchain transaction, such as a payload size, the transaction fee specified in the blockchain transaction, In one example, the likelihood of completion calculation relies on a distribution (e.g. a normal distribution) centered on the average or median transaction fee obtained from the blockchain network and outputs a probability or time to completion based on finding a point on the distribution curve using the transaction fee set in the blockchain transaction. In another example, the likelihood of completion calculation is based on the average or median time to transaction confirmation metric and the maximum time to confirmation value. In another example, the likelihood of completion calculation is based on a combination of the count of unconfirmed transactions, the network gas price, the transaction fee specified in the blockchain transaction, and other metrics. In a further example, the likelihood of completion is based on a combination of metrics and transaction details and employs a machine-learning engine to output a time-to-confirmation estimate. Other methods may be used to determine the likelihood of completion.

In operation 410, the determined likelihood of completion is compared to a minimum threshold value. In the case where the likelihood of completion is an estimated time to completion, the minimum threshold value may be a maximum time permissible. In this example, however, the likelihood of completion is a probability of completion within the maximum time window. The minimum threshold value is thus a minimum probability. If the likelihood of completion is larger than the minimum threshold value, then it is considered sufficiently likely or probable and the method 400 proceeds to operation 412 to record a hold in association with the item(s). However, if the blockchain transaction's likelihood of completion is found to be lower than the minimum threshold value then the system does not record a hold in association with the item(s), as indicated by operation 414.

If a hold is recorded in operation 412, then the system awaits confirmation that the payment has been completed, e.g. that the blockchain payment transaction has been confirmed, as shown in operation 416. Once confirmed, then in operation 418 the system removes the hold and decrements the inventory count and, in operation 430, initiates a fulfillment process. The fulfillment process may include whatever pick-and-pack, shipping, download, or other distribution operations result from successful purchase of the item(s).

If a hold was not recorded because the likelihood of completion was too low, then in operation 420 the system awaits payment confirmation. If the transaction expires, fails, or is refused by the blockchain network (not shown), the method 400 may terminate and notifications to the merchant and or user may be generated and sent regarding the failed blockchain-based payment operation. However, if the blockchain transaction is confirmed then in operation 422 the system assesses whether there is inventory available for fulfillment of the transaction since no hold was placed on items in inventory. If not, then in operation 428 the user may be notified and refund procedures may be invoked by the system to process a refund of the payment provided. However, if inventory is available then in operation 424 the inventory count is decremented and the fulfillment process is initiated in operation 430.

Although not shown in FIG. 4, at operation 414, while awaiting payment completion, in some implementations the system may return to operation 406 in order to obtain updated blockchain network metrics and to re-evaluate the likelihood of completion. If, in re-determining the likelihood of completion, the system determines in operation 410 that the likelihood now exceeds the minimum threshold value, then it records a hold in operation 412; otherwise, it returns to operations 414 and 420 to await payment. The re-determination may be periodic, e.g. every 10 minutes, hour, etc., or may be triggered by an event such as the system detecting more than a threshold change in a blockchain metric, e.g. a change in the metric by more than 10%.

In some cases, a similar re-determination operation may occur while awaiting payment at operation 416 after having recorded a hold. The system may re-evaluate whether the likelihood of completion still exceeds the minimum threshold value. If not, then it may remove the hold in operation 414. Otherwise, it may retain the hold and continue awaiting payment in operation 416.

Figure 5:
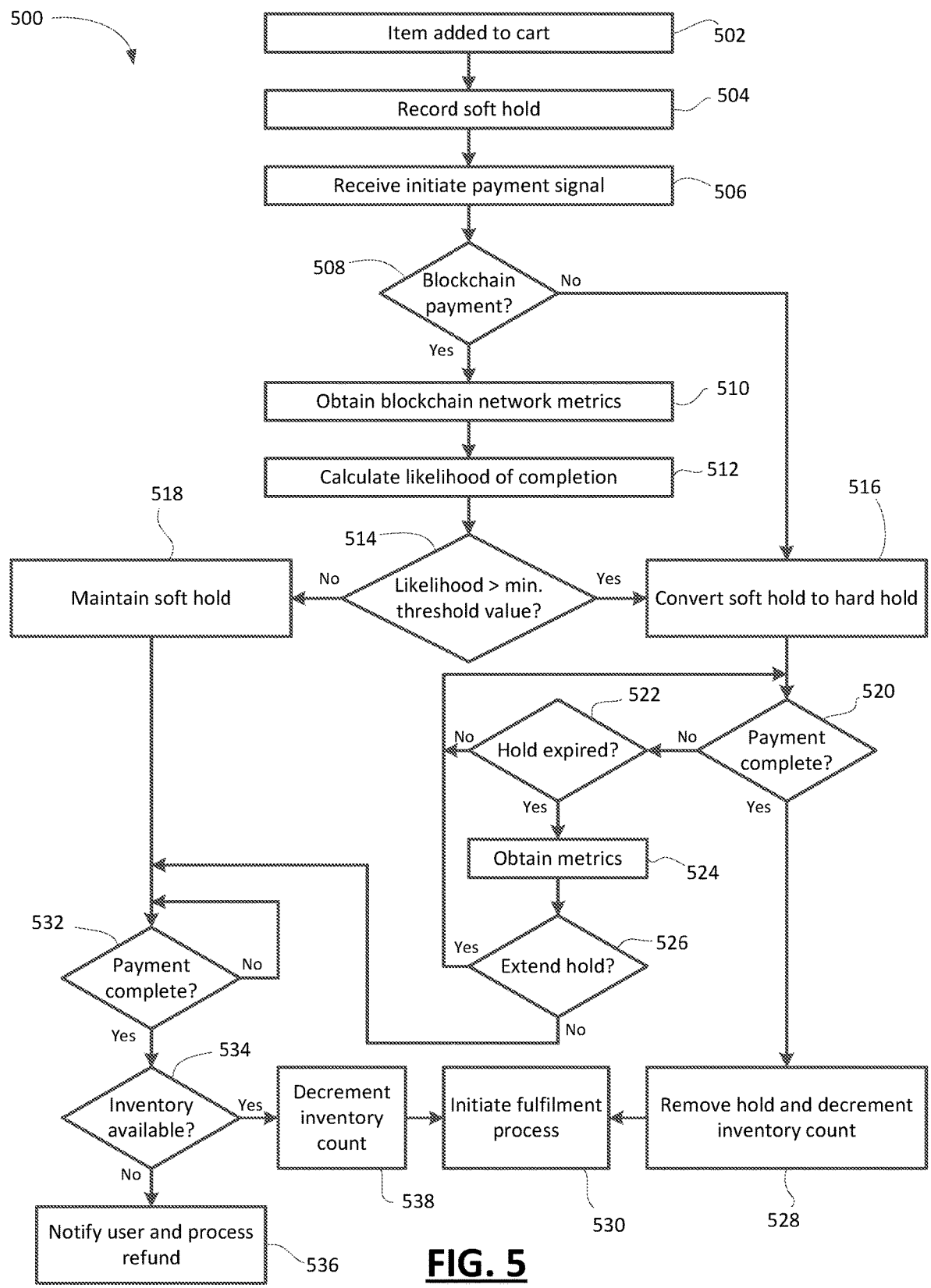
FIG. 5 shows another example method of managing inventory in an e-commerce system.

Another example method 500 of managing inventory in an e-commerce system is shown in FIG. 5. The method 500 may be implemented by a computing platform, such as an e-commerce platform in some cases. In particular, the method 500 may be implemented by way of suitably-programmed software instructions stored in memory on a computing device which, when executed by one or more processors of the computing device, cause the computing device to carry out the described operations. In some cases, the method 500 may be implemented by one or more servers forming an e-commerce platform or system, such as the computing system 1004 (FIG. 1). Although the following method 500 is described in the context of an e-commerce implementation, it will be appreciated that the operations of the method 500 may be generalized to apply in applications and contexts other than e-commerce.

In this example, the user device may have an active browsing session with the e-commerce platform. In this active browsing session, the user device may have an associated virtual cart object or other data structure recording product items selected by the user along with any related data, such as a quantity. In operation 502, the system receives a signal from the user device adding a product item to the virtual cart. In response to the product item being added to the virtual cart, the system records a 'soft hold' in memory in association with the product item in operation 504. The soft hold places a temporary reservation on the product item (in the quantity indicated by the cart) so that there is sufficient inventory available when the user checks out and completes payment; however, the soft hold may have a short expiry time, such as 5 or 10 minutes, or may be configured to expire as soon as the active browsing session ends. In that manner, if the user leaves the browsing session and/or loses connectivity such that the session ends, the soft hold is removed. This avoids indefinitely tying up inventory. Even if the user reconnects to the system in a different browsing session and retrieves the 'abandoned' cart by way of a stored cart token or identifier, there is no longer a soft hold in place.

In operation 506, the system receives an initiate payment signal. The initiate payment signal is received in the context of the active browsing session. In this example, the initiate payment signal may include selection of a "pay now" button or the like, or initiation of a checkout process during which the user device transmits identifying information, shipping information, or other data for completion of the checkout, including selection of a payment type (e.g. credit card, debit card, digital wallet, or blockchain-based transaction, etc.).

If, in operation 508, the system determines that the requested payment operation is not a blockchain-based payment, then it proceeds to operation 512 to record a hard hold in association with the item (or items) that is the subject of the payment request. This may include converting the soft hold to a hard hold, which may include revising or replacing the recorded soft hold with indication of a hard hold on the inventory item. The "hard hold" is a hold that reserves the inventory item indefinitely until payment has been completed and fulfillment initiated, or payment has been refused/failed. In some cases, the "hard hold" may have an expiry time, but it may be a longer period of time that is associated with a "soft hold".

If the payment operation is determined to be blockchain-based payment in operation 508, then the method proceeds to operation 510, in which the system obtains blockchain network metrics. These may be obtained prior to receiving the payment signal during the browsing session and retrieved from memory in some cases, or may be obtained in response to receipt of the initiate payment signal in some cases. In some implementations, they may be obtained through querying a blockchain node or a non-blockchain computing device with access to blockchain network metrics. Example metrics may include a measure of a time for transaction confirmation for recently confirmed transactions on the blockchain network. The measure may be an average, or median, or some other such measure. The metrics may include a count of unconfirmed transactions in a mempool associated with the blockchain network. The metrics may include an average or median age of unconfirmed transaction in the mempool. The metrics may include a measure of transaction fees for recently confirmed transactions, such as an average or median fee. The metrics may include one or a combination of these examples in some cases.

In operation 512, the system determines a likelihood of completion for the blockchain transaction associated with the current payment request. The likelihood of completion may be a calculated probability of transaction confirmation (e.g. inclusion in a mined block) within a certain window of time, e.g. a maximum time to confirmation. The likelihood of completion may be an estimated time to transaction confirmation. These likelihood of completion calculation may use a function that takes, as inputs, one or more blockchain metrics obtained in operation 510. In some cases, the function further takes as inputs one or more features of the blockchain transaction, such as a payload size, the transaction fee specified in the blockchain transaction, In one example, the likelihood of completion calculation relies on a distribution (e.g. a normal distribution) centered on the average or median transaction fee obtained from the blockchain network and outputs a probability or time to completion based on finding a point on the distribution curve using the transaction fee set in the blockchain transaction. In another example, the likelihood of completion calculation is based on the average or median time to transaction confirmation metric and the maximum time to confirmation value. In another example, the likelihood of completion calculation is based on a combination of the count of unconfirmed transactions, the network gas price, the transaction fee specified in the blockchain transaction, and other metrics. In a further example, the likelihood of completion is based on a combination of metrics and transaction details and employs a machine-learning engine to output a time-to-confirmation estimate. Other methods may be used to determine the likelihood of completion.

In operation 514, the determined likelihood of completion is compared to a minimum threshold value. In the case where the likelihood of completion is an estimated time to completion, the minimum threshold value may be a maximum time permissible. In this example, however, the likelihood of completion is a probability of completion within the maximum time window. The minimum threshold value is thus a minimum probability. If the likelihood of completion is larger than the minimum threshold value, then it is considered sufficiently likely or probable and the method 500 proceeds to operation 516 to record a hard hold in association with the item(s). Recordal of the hard hold may include converting the soft hold to a hard hold. However, if the blockchain transaction's likelihood of completion is found to be lower than the minimum threshold value then the system does not record a hold in association with the item(s), as indicated by operation 518.

In this example, the hard hold features an expiry time. The expiry time may be set based on the likelihood of completion analysis of operation 512. That is the likelihood of completion analysis may include determining a likely time to completion. This may be based on the blockchain network metrics, such as an average transaction completion time for recently confirmed transactions. In some cases, the expiry time may be a default window of time set in the system.

If a hold is recorded in operation 516, then the system awaits confirmation that the payment has been completed, e.g. that the blockchain payment transaction has been confirmed, as shown in operation 520. In this example, while awaiting confirmation the system evaluates whether the hold expiry time has been reached, as indicated by operation 522. If so, then in operation 524 the system may obtain updated blockchain network metrics and may determine, in part using the metrics, whether to extend the hold expiry time in operation 526. This determination may be based on whether the blockchain metrics indicate the status of the network has changed such that it is now expected to take longer for a transaction to confirm. This may indicate that transaction confirmation is still sufficiently likely, but that it may take longer than previously anticipated. Alternatively, the determination may conclude that the network status is unchanged or has changed to shorten the expected confirmation time, which may indicate that the previously-determined likelihood of completion may have been inaccurate and that the transaction is now less likely to be confirmed. Based on this analysis the system may determine an updated expected time to confirmation and compare it to a maximum confirmation time. If it exceeds the maximum confirmation time, it may determine that the hold should not be extended. In another example, the system may predetermine the likelihood of completion based on the updated metrics and re-assess whether the likelihood of completion is greater than the minimum threshold value. If not, then it may not extend the hard hold expiry time. If the system extends the hard hold expiry time, then it returns to operation 520 to await payment confirmation.

Once payment is confirmed, then in operation 526 the system removes the hold and decrements the inventory count and, in operation 530, initiates a fulfillment process. The fulfillment process may include whatever pick-and-pack, shipping, download, or other distribution operations result from successful purchase of the item(s).

If a hold was not recorded in operation 518 because the likelihood of completion was too low, then the soft hold remains in place (unless it expires). If the hard hold was put in place, but expires, then the hard hold is removed. In some implementations, this may include converting the hard hold to a soft hold. In either case, the method 500 awaits completion of the payment through confirmation of the blockchain transaction in operation 532. If the blockchain transaction expires, fails, or is refused by the blockchain network (not shown), the method 500 may terminate and notifications to the merchant and or user may be generated and sent regarding the failed blockchain-based payment operation. However, if the blockchain transaction is confirmed then in operation 534 the system assesses whether there is inventory available for fulfillment of the transaction since no hold, or only a soft hold, was placed on items in inventory. If inventory is exhausted such that the purchase cannot be fulfilled, then in operation 536 the user device may be notified and refund procedures may be invoked by the system to process a refund of the payment provided. However, if inventory is available then in operation 538 the inventory count is decremented and the fulfillment process is initiated in operation 530.

Although not shown in FIG. 5, at operation 532, while awaiting payment completion, in some implementations the system may return to operation 510 in order to obtain updated blockchain network metrics and to re-evaluate the likelihood of completion. If, in re-determining the likelihood of completion, the system determines in operation 514 that the likelihood now exceeds the minimum threshold value, then it may convert the soft hold to a hard hold in operation 516; otherwise, it returns to operations 518 and 532 to await payment. The re-determination may be periodic, e.g. every 10 minutes, hour, etc., or may be triggered by an event such as the system detecting more than a threshold change in a blockchain metric, e.g. a change in the metric by more than 10%, or upon expiry of the soft hold in which case the options may be to create a hard hold, renew the soft hold, or forego creating any hold.

Figure 6:
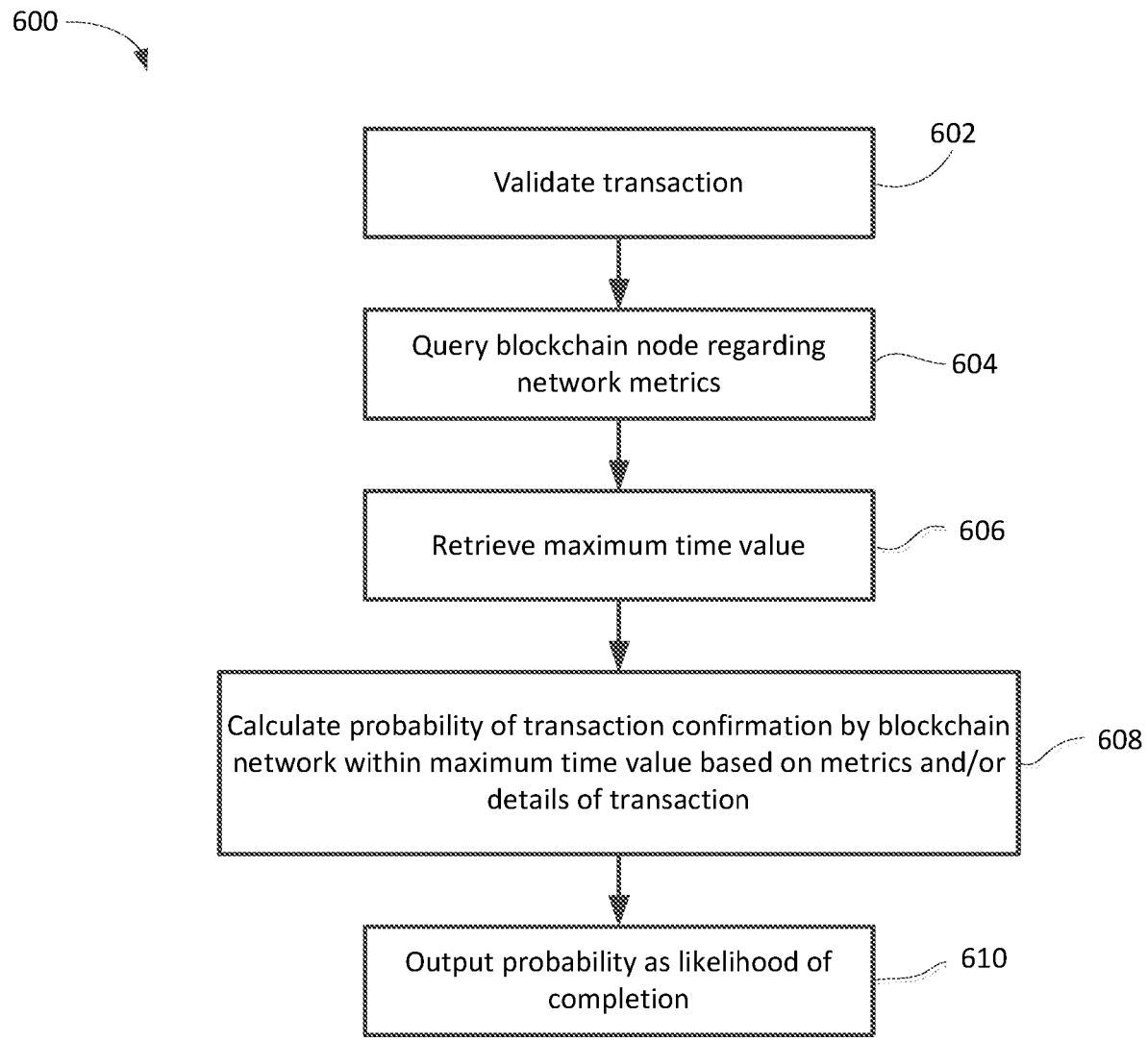
FIG. 6 shows one example process for determining a likelihood of completion in association with a blockchain-based payment operation.
Figure 7:
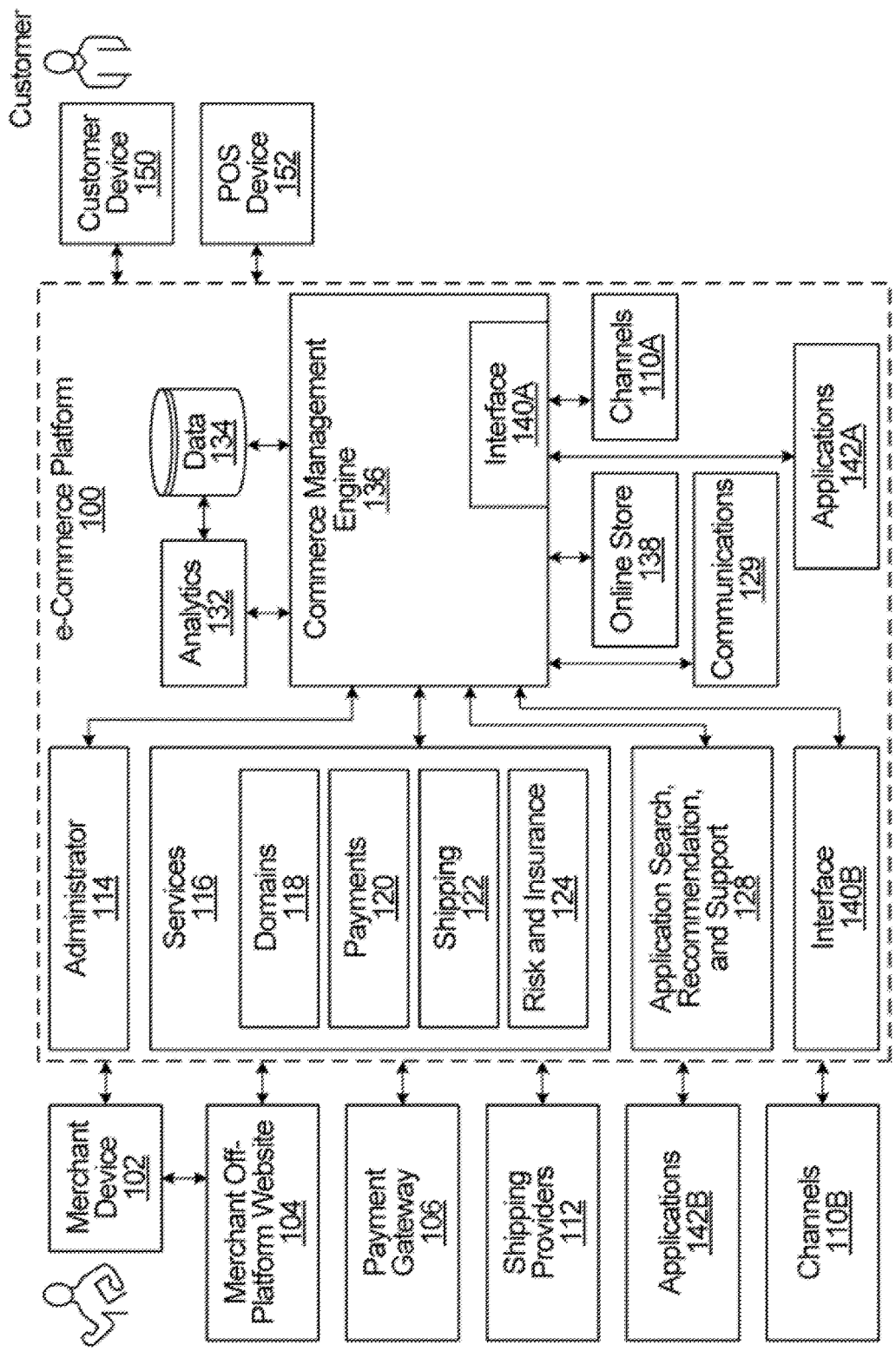
FIG. 7 is a block diagram of an e-commerce platform, in accordance with an example embodiment.

Reference will now be made to FIG. 6, which shows, in flowchart form, one simplified example method 600 for determining a likelihood of completion with regard to a blockchain-based payment request. The method 600 may be initiated on detection of a blockchain-based payment request, which may occur during a checkout or payment process on an e-commerce platform. The e-commerce platform may facilitate blockchain-based payments, for example through directly generating a payment transaction, having a user device digitally sign the payment transaction, and submitting the signed payment transaction for propagation on a blockchain network. In some cases, the e-commerce platform may provide a payment amount and merchant recipient credentials, such as a payment wallet address or the like, to a user device and the user device may generate and sign a blockchain transaction transferring the payment account to the merchant wallet address. The user device may send a copy of the transaction or its transaction identifier to the e-commerce platform and the e-commerce platform may verify with a blockchain node that the transaction has been propagated on the blockchain network and appears in one or more mempools. It may obtain a copy of the transaction from the user device or from the blockchain network, e.g. from a blockchain node.

In some implementations, the e-commerce platform may validate the transaction in operation 602. This may not be necessary in some cases as the transaction will be rejected by the blockchain nodes if not valid; however, the e-commerce platform may be configured to ensure it is a valid blockchain transaction particularly if it is generating the transaction, and submitting it to the blockchain network once it is signed by the user device. The validation may be performed by an external service, such as a blockchain node, in some cases. The criteria for validation of the transaction are based on the applicable blockchain protocol and typically include verification of signature(s), confirmation that addresses and/or outpoints are valid and have sufficient associated digital assets recorded on chain, among other things.

In operation 604 the system may obtain blockchain network metrics, for example through querying of a blockchain node or another computing device configured to monitor the status of the blockchain network and determine applicable metrics. Example metrics may include a count of unconfirmed transactions, a measure of time to confirmation for recently-confirmed transactions, a measure of transaction fee size for recently-confirmed transactions, a current gas fee, or other such metrics.

In operation 606, in some implementations, the system may determine a maximum time value. The maximum time value may be a default predetermined maximum time to confirmation set by the system. In some cases, the maximum time value may be a configurable value and may be set by individual merchants to indicate the maximum length of time they wish to have the system hold inventory while awaiting completion of a blockchain transaction. The value may be set and saved in memory as part of merchant data stored at the system.

The system then determines the likelihood of completion of the blockchain transaction in operation 608. In this example, this may include calculating a probability that the blockchain transaction will be confirmed by the blockchain network within the maximum time value. The calculation may be based on one or more of the metrics obtained in operation 604. In some cases, the calculation may further be based on details of the blockchain transaction, such as its transaction fee or its payload size. In some cases, the likelihood of completion is a calculated probability value between 0 and 1 that indicates the probability that the transaction will be confirmed prior to the maximum time value. In another example, operation 608 may instead include determining a projected time to transaction confirmation. That is, the system may calculate an expected time within which the transaction is expected to be confirmed.

In operation 610, the determined likelihood of completion, e.g. the probability value, is output.

In any of the above-described example methods or processes it will be understood that certain operations described as occurring in sequence may be implemented in a different sequence or carried out in parallel without impacting the overall functioning of the method or process.

Example E-commerce Platform

Although integration with a commerce platform is not required, in some embodiments, the methods disclosed herein may be performed on or in association with a commerce platform such as an e-commerce platform. Therefore, an example of a commerce platform will be described.

Figure 8:
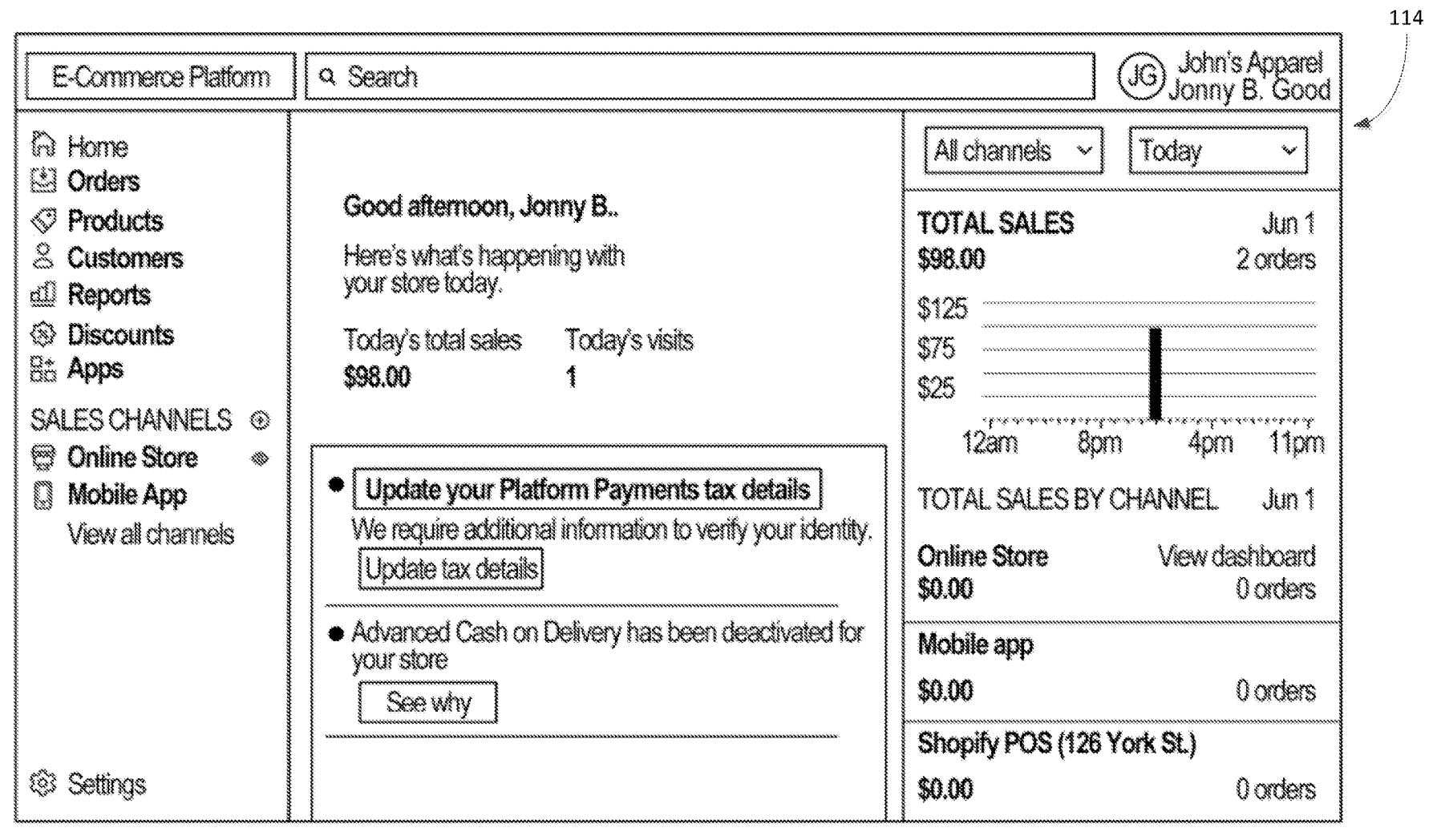

FIG. 8 illustrates an example e-commerce platform 100, according to one embodiment. The e-commerce platform 100 may be exemplary of the e-commerce system 1004 described with reference to FIG. 1. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a "merchant" and a "customer" may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to "merchants" and "customers", and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 8, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point-of-sale (POS) devices 152 in physical locations (e.g., a physical storefront or other location such as through a kiosk, terminal, reader, printer, 3D printer, and the like). The example computing device 200 of FIG. 1 may be exemplary of each POS device 152.

A merchant may utilize the e-commerce platform 100 as a sole commerce presence with customers, or in conjunction with other merchant commerce facilities, such as through a physical store (e.g., "brick-and-mortar" retail stores), a merchant off-platform website 104 (e.g., a commerce Internet website or other internet or web property or asset supported by or on behalf of the merchant separately from the e-commerce platform 100), an application 142B, and the like. However, even these "other" merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through "buy buttons" that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point-of-sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML) template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally, or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment facility 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

FIG. 9 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 9. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a "view all recent activity" dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as. for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 8, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) to transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and tracks quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Implementations

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In some embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g., Long-Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method, comprising:
   receiving, at an e-commerce system from a user device, an initiate payment signal with regard to an item, wherein the initiate payment signal is associated with a blockchain transaction;

responsive to the initiate payment signal,
  determining an inventory count associated with the item;
  determining a likelihood of completion with regard to the blockchain transaction based on one or more blockchain network metrics related to recent transactions on the blockchain, wherein determining the likelihood of completion includes determining the likelihood that the transaction will be confirmed on the blockchain within a maximum window of time;
  responsive to the likelihood of completion being above a minimum threshold value, recording a hold in memory in association with the inventory count; and
  determining that the blockchain transaction has been completed and, in response, removing the hold from memory and decrementing the inventory count.

2. The method of claim 1, wherein determining the likelihood of completion includes querying a computing device and receiving, from the computing device, the one or more blockchain network metrics.

3. The method of claim 2, wherein the computing device includes a blockchain node in a blockchain network.

4. The method of claim 2, wherein the one or more blockchain network metrics includes one or more of a count of unconfirmed transactions, a measure of transaction confirmation time, a gas price, or a measure of transaction fee size.

5. The method of claim 1, wherein determining the likelihood of completion is further based on one or more of a payload size, a transaction fee associated with the blockchain transaction, or stored user data associated with the user device.

6. The method of claim 1, wherein the hold includes an expiry time, and the method further includes, prior to determining that the blockchain transaction has been completed, re-determining the likelihood of completion at the expiry time and, responsive to the likelihood of completion being above the minimum threshold value, updating the expiry time to a later time.

7. The method of claim 1, wherein the hold includes a hard hold that reserves at least one of the inventory count of the item to block competing purchases.

8. The method of claim 7, wherein a number of hard holds associated with the inventory count matches the inventory count for the item, and further comprising receiving a competing purchase request from a further user device with regard to the item and, based on the inventory count matching the number of hard holds, refusing the request.

9. The method of claim 1, wherein the maximum window of time is a merchant maximum time setting stored in the memory, and determining the likelihood of completion includes determining a projected time within which the transaction will be confirmed on the blockchain and determining that the projected time is less than the merchant maximum time setting.

10. The method of claim 1, wherein determining that the blockchain transaction has been completed includes determining that the blockchain transaction has been included in a block within the blockchain.

11. A computing system, comprising:
  one or more processing units;
  one or more data storage units; and
  memory storing processor-executable instructions that, when executed by the one or more processing units, are to cause the one or more processing units to:
    receive, at an e-commerce system from a user device, an initiate payment signal with regard to an item, wherein the initiate payment signal is associated with a blockchain transaction;
    responsive to the initiate payment signal,
      determine an inventory count associated with the item;
      determine a likelihood of completion with regard to the blockchain transaction based on one or more blockchain network metrics related to recent transactions on the blockchain, wherein determining the likelihood of completion includes determining the likelihood that the transaction will be confirmed on the blockchain within a maximum window of time;
      responsive to the likelihood of completion being above a minimum threshold value, record a hold in memory in association with the inventory count; and
    determine that the blockchain transaction has been completed and, in response, removing the hold from memory and decrementing the inventory count.

12. The computing system of claim 11, wherein the instructions, when executed, are to cause the one or more processing units to determine the likelihood of completion by querying a computing device and receiving, from the computing device, the one or more blockchain network metrics.

13. The computing system of claim 12, wherein the computing device includes a blockchain node in a blockchain network.

14. The computing system of claim 12, wherein the one or more blockchain network metrics includes one or more of a count of unconfirmed transactions, a measure of transaction confirmation time, a gas price, or a measure of transaction fee size.

15. The computing system of claim 11, wherein the instructions, when executed, are to cause the one or more processing units to determine the likelihood of completion further based on one or more of a payload size, a transaction fee associated with the blockchain transaction, or stored user data associated with the user device.

16. The computing system of claim 11, wherein the hold includes an expiry time, and wherein the instructions, when executed, are to cause the one or more processing units to, prior to determining that the blockchain transaction has been completed, re-determine the likelihood of completion at the expiry time and, responsive to the likelihood of completion being above the minimum threshold value, update the expiry time to a later time.

17. The computing system of claim 11, wherein the hold includes a hard hold that reserves at least one of the inventory count of the item to block competing purchases.

18. A non-transitory computer-readable media storing processor-executable instructions, wherein the instructions, when executed, are to cause one or more processing units to:
  receive, at an e-commerce system from a user device, an initiate payment signal with regard to an item, wherein the initiate payment signal is associated with a blockchain transaction;
  responsive to the initiate payment signal,
    determine an inventory count associated with the item;
    determine a likelihood of completion with regard to the blockchain transaction based on one or more blockchain network metrics related to recent transactions on the blockchain, wherein determining the likelihood of completion includes determining the likelihood that the transaction will be confirmed on the blockchain within a maximum window of time;

responsive to the likelihood of completion being above a minimum threshold value, record a hold in memory in association with the inventory count; and determine that the blockchain transaction has been completed and, in response, removing the hold from memory and decrementing the inventory count.

19. The computing system of claim 11, wherein the maximum window of time is a merchant maximum time setting stored in the memory, and wherein the instructions, when executed, are to further cause the one or more processing units to determine the likelihood of completion by determining a projected time within which the transaction will be confirmed on the blockchain and determining that the projected time is less than the merchant maximum time setting.

20. The non-transitory computer readable media of claim 18, wherein the maximum window of time is a merchant maximum time setting, and wherein the instructions, when executed, are to further cause the one or more processing units to determine the likelihood of completion by determining a projected time within which the transaction will be confirmed on the blockchain and determining that the projected time is less than the merchant maximum time setting.

* * * * *